United States Patent
Jouy et al.

(10) Patent No.: US 10,648,366 B2
(45) Date of Patent: May 12, 2020

(54) TURBINE ENGINE EXHAUST CASING WITH IMPROVED LIFETIME

(71) Applicant: SAFRAN AIRCRAFT ENGINES, Paris (FR)

(72) Inventors: Baptiste Marie Aubin Pierre Jouy, Moissy-Cramayel (FR); Bertrand Guillaume Robin Pellaton, Moissy-Cramayel (FR); Sebastien Jean Laurent Prestel, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 123 days.

(21) Appl. No.: 15/746,375

(22) PCT Filed: Jul. 20, 2016

(86) PCT No.: PCT/FR2016/051870
§ 371 (c)(1),
(2) Date: Jan. 19, 2018

(87) PCT Pub. No.: WO2017/013356
PCT Pub. Date: Jan. 26, 2017

(65) Prior Publication Data
US 2018/0195416 A1  Jul. 12, 2018

(30) Foreign Application Priority Data
Jul. 21, 2015 (FR) ..................................... 15 56893

(51) Int. Cl.
*F01D 25/30* (2006.01)
*F01D 9/06* (2006.01)
(Continued)

(52) U.S. Cl.
CPC ............. *F01D 25/30* (2013.01); *F01D 9/065* (2013.01); *F02C 3/13* (2013.01); *F02C 9/18* (2013.01);
(Continued)

(58) Field of Classification Search
CPC ........ F01D 25/24; F01D 25/243; F01D 25/28; F01D 25/30; F01D 25/305; F01D 9/065;
(Continued)

(56) References Cited

U.S. PATENT DOCUMENTS 5,134,844 A  8/1992 Lee et al.
5,316,437 A  5/1994 Czachor
(Continued)

FOREIGN PATENT DOCUMENTS

FR  2103560 A1  4/1972

OTHER PUBLICATIONS

Preliminary Research Report received for French Application No. 1556893, dated May 27, 2016, 3 pages (1 page of French Translation Cover Sheet and 2 pages of original document).
(Continued)

*Primary Examiner* — Richard A Edgar
*Assistant Examiner* — Maxime M Adjagbe
(74) *Attorney, Agent, or Firm* — Womble Bond Dickinson (US) LLP (57) ABSTRACT

The invention relates to an exhaust casing for a turbine engine of an aircraft, including: a collar (4), a hub (5), hollow arms (63) connecting said collar (4) to said hub (5), and an opening piece (3) which is located on the collar (4) and is suitable for being connected to an outlet tube (30) of a transient-operation valve of the turbine engine. In said exhaust casing, said opening piece (3) is attached onto the collar (4) and forms an extension of a hollow arm (63) such
(Continued)

that an air flow (7) leaving the outlet tube (30) of the transient-operation valve penetrates the hollow arm (63) and flows into the hub (5).

15 Claims, 6 Drawing Sheets

(51) Int. Cl.
*F02C 3/13* (2006.01)
*F02C 9/18* (2006.01)

(52) U.S. Cl.
CPC .. *F05D 2220/323* (2013.01); *F05D 2250/314* (2013.01); *F05D 2260/20* (2013.01); *F05D 2260/941* (2013.01); *F05D 2270/101* (2013.01); *F05D 2270/114* (2013.01); *F05D 2300/50212* (2013.01); *Y02T 50/675* (2013.01)

(58) Field of Classification Search
CPC .. B64D 27/26; F05D 2240/90; F05D 2260/20
See application file for complete search history.

(56) References Cited

U.S. PATENT DOCUMENTS

| | | | |
|---|---|---|---|
| 5,483,792 A * | 1/1996 | Czachor | F01D 25/162 60/796 |
| 6,185,925 B1 * | 2/2001 | Proctor | F01D 11/24 415/177 |
| 2014/0119880 A1 | 5/2014 | Rodriguez et al. | |

OTHER PUBLICATIONS

International Search Report and Written Opinion received for PCT Patent Application No. PCT/FR2016/051870, dated Nov. 7, 2016, 18 pages (8 pages of English Translation and 10 pages of Original Document).
International Preliminary Report on Patentability received for PCT Patent Application No. PCT/FR2016/051870, dated Feb. 1, 2018, 13 pages (7 pages of English Translation and 6 pages of Original Document).

* cited by examiner

TURBINE ENGINE EXHAUST CASING WITH IMPROVED LIFETIME

The present invention relates to a turbine engine exhaust casing for an aircraft, the lifetime of which is increased.

More precisely, it relates to an exhaust casing allowing the forces created by the temperature differences between a shroud and a hub of said exhaust casing to be limited.

GENERAL TECHNICAL FIELD AND PRIOR ART

The lifetime of an exhaust casing (or Turbine Rear Frame, TRF) is highly impacted by the forces created by temperature differences between a shroud and a hub of said exhaust casing. More particularly these forces are created at the arms which connect the external shroud to the internal hub.

Thus, during the takeoff of the aircraft or acceleration phases, the shroud is heated faster than the hub which is more massive, and this temperature difference between the two parts creates tension forces at the arms which connect the shroud to the hub because, under the influence of heat, the shroud dilates faster than the hub.

On the contrary, upon stopping the turbomachine, the shroud cools faster than the hub, thus creating compression forces at said arms which connect the shroud to the hub.

GENERAL PRESENTATION OF THE INVENTION

One general goal of the invention is to propose a solution allowing the forces created by the temperature differences between the shroud and the hub to be limited, so as to increase the lifetime of the arms connecting the shroud to the hub, and thus that of the entire exhaust casing. Moreover, this solution must be simple so as to be able to be easily implemented on an aircraft turbine engine, without incurring a considerable excess cost.

More particularly, according to a first aspect, the invention proposes an exhaust casing for an aircraft turbine engine comprising a shroud, a hub forming a cavity, hollow arms connecting said shroud to said hub, and at least one mouth situated on the shroud and which is suitable to be connected to an outlet tube of a transient-operation valve of the turbine engine, characterized in that said at least one mouth is attached to the shroud in the extension of a hollow arm, so that an air flow exiting the outlet tube of the transient-operation valve penetrates into the hollow arm and circulates in the cavity of the hub.

Such a device allows the temperature difference between the hub and the shroud during takeoff or acceleration phases of the aircraft to be limited by heating said hub, and thus allows an increase in the lifetime of the exhaust casing.

According to an additional feature, the exhaust casing comprises at least one yoke arm and a hollow arm adjoining said yoke arm comprises a deflector so as to deflect the air flow exiting said hollow arm toward a stiffener of the yoke arm.

According to a supplementary feature, the hollow arm adjoining the yoke arm comprises a stiffener which comprises a side orifice, and the deflector is situated inside the stiffener of said hollow arm so as to deflect at least a portion of the air flow exiting said hollow arm toward the stiffener of the yoke arm through said side orifice.

According to a particular feature, the hollow arm which adjoins the yoke arm comprises a stiffener which comprises a front orifice, and the deflector is situated at said front orifice.

According to another feature, the deflector is a curved sheet-metal part.

According to an additional feature, the exhaust casing is an exhaust casing with tangential arms.

According to a second aspect, the invention proposes a turbine engine comprising an exhaust casing according to one of the aforementioned features, in which said turbine engine comprises a transient bleed valve comprising an outlet tube which is connected to a mouth of said exhaust casing.

According to a third aspect, the invention proposes an aircraft comprising a turbine engine according to the aforementioned feature.

DESCRIPTION OF THE FIGURES

Other characteristics, aims and advantages of the present invention will appear upon reading the detailed description which follows, and with reference to the appended drawings, given as non-limiting examples and in which.

DESCRIPTION OF ONE OR MORE EXEMPLARY EMBODIMENTS

Figure 1A:
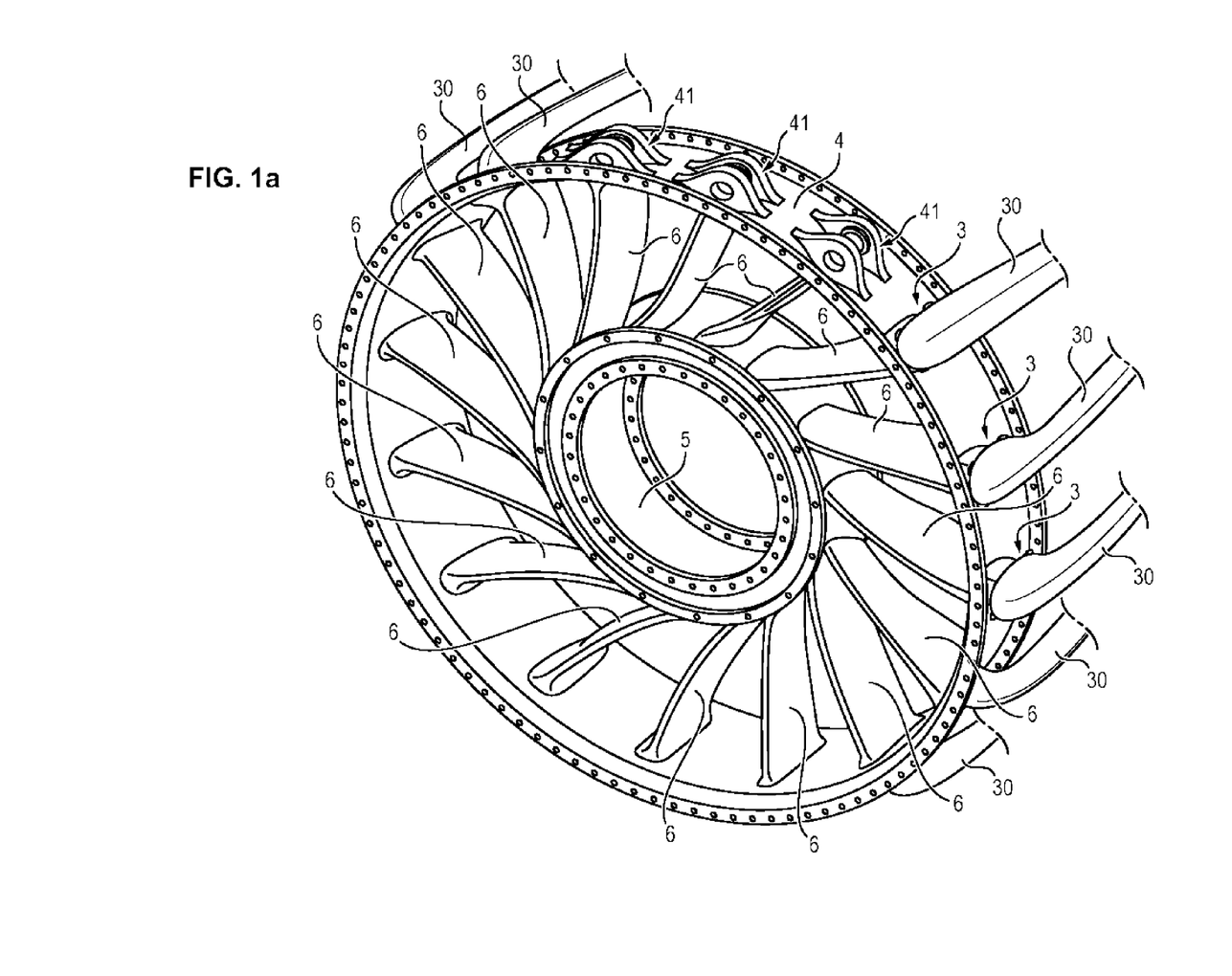
FIG. 1a shows a perspective view of an exhaust casing according to a first embodiment.
Figure 1B:
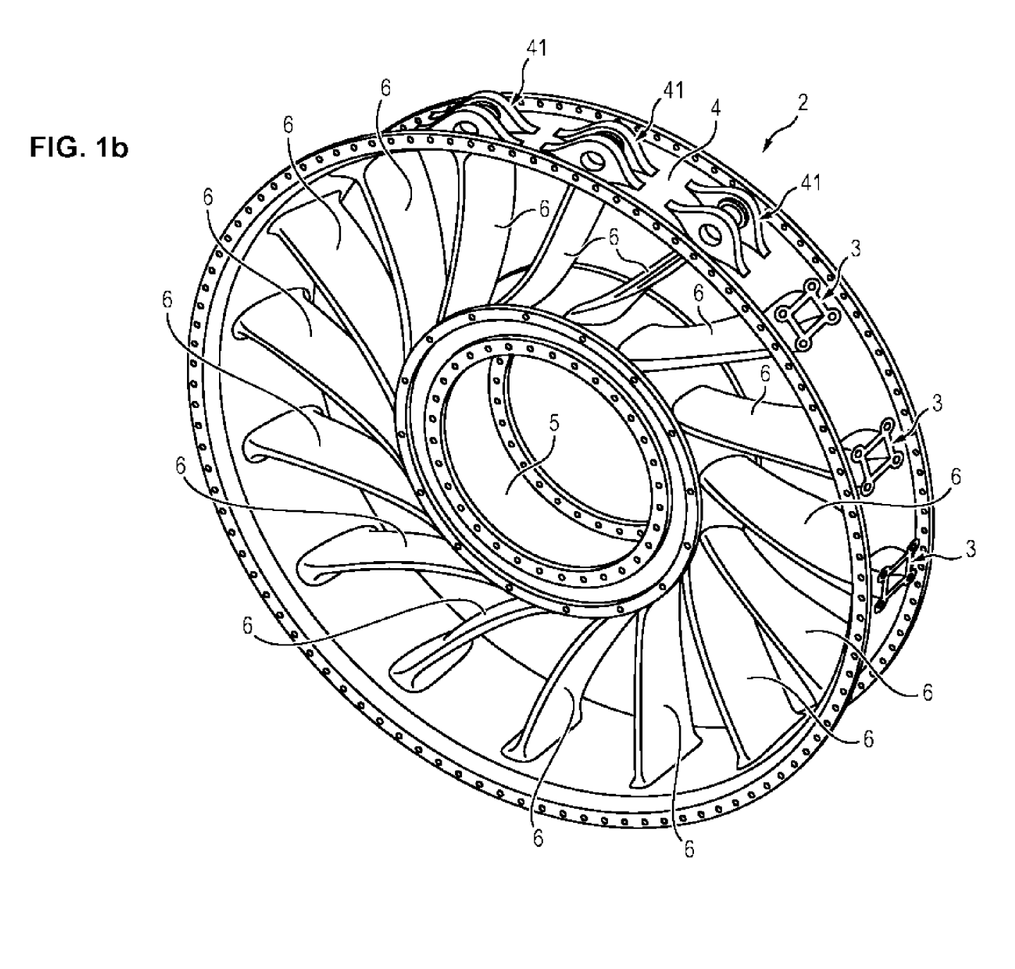
FIG. 1b shows the same view as FIG. 1a but the outlet tubes of the transient bleed valve are not shown so that the mouths are more visible.

Shown in FIGS. 1a and 1b are a first embodiment of an exhaust casing 2 to which are attached outlet tubes 30 of a transient-operation valve (or Transient Bleed Valve, TBV) of an aircraft turbine engine.

The exhaust casing 2 comprises a shroud 4 and a hub 5 which are connected by a plurality of arms 6, as well as mouths 3 which are situated on the shroud 4, forming an extension of several arms 6. The hub 5 comprises a cavity at its center.

Among this plurality of arms 6, the exhaust casing 2 comprises yoke arms 61 (three in the embodiment represented in FIGS. 1a, 1b and 2) which are disposed at the attachment elements 41 of the shroud 4 to the aircraft. These yoke arms 61 are arms 6 which are not hollow and which assure the mechanical strength of the exhaust casing 2. The yoke arms 61 are not connected to any mouth 3. No mouth 3 is attached to the shroud 4 in the extension of the yoke arms 61.

The exhaust casing 2 also comprises oil utility arms 62 in which are installed oil circulation circuits feeding the hydraulic circuits for controlling utilities (such as flaps, brakes, the landing gear). In the embodiment illustrated in FIG. 2, the exhaust casing 2 comprises three oil utility arms 62, which are disposed opposite the three yoke arms 61 with respect to the hub 5. The oil utility arms 62 are not connected to any mouth 3. No mouth 3 is attached to the shroud 4 in the extension of the oil utility arms 62.

Finally, the exhaust casing 2 also comprises hollow arms 63 which each comprise a cavity which is open at both ends, hence at the shroud 4 and the hub 5. In the first embodiment, all the hollow arms 63 are connected to a mouth 3. More precisely, a mouth 3 is applied to the shroud 4 (by welding for example) in the extension of each hollow arm 63, so that when an outlet tube 30 is attached to the mouth 3, the air flow 7 exiting said outlet tube 30 penetrates directly into the cavity of the hollow tube 63. The mouth 3 is an applied part which is attached to the shroud 4 of the exhaust casing 2, and which makes it possible to ensure the attachment of the outlet tube 30 on the shroud 4, and its sealing.

Figure 2:
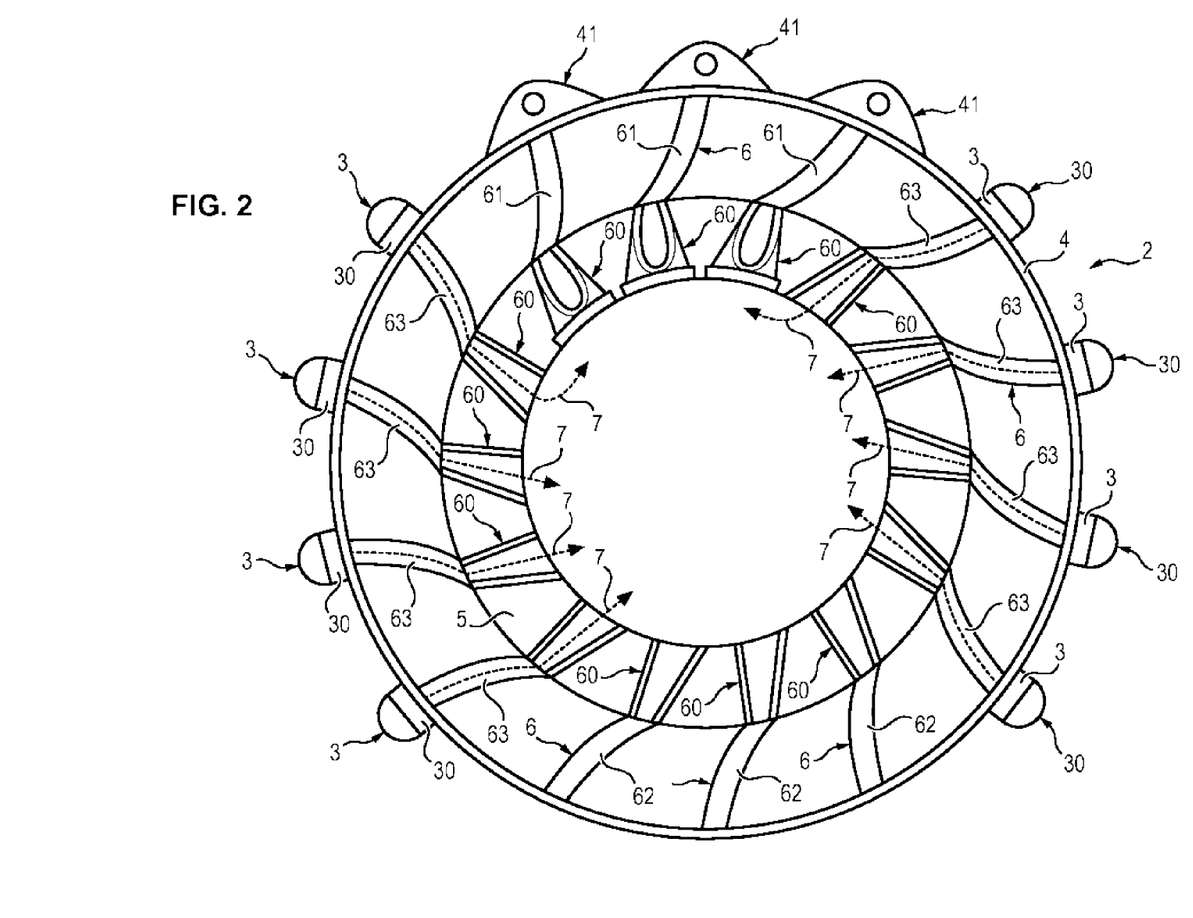
FIG. 2 shows a view of a section of the exhaust casing according to the first embodiment.

As illustrated in FIG. 2, the outlet tubes 3 of the transient-operation valve are each connected to a hollow arm 63 through a mouth 3, so that an air flow 7 exiting the transient-operation valve penetrates into the hollow arm 63 and circulates inside the hub 5, and more precisely in the cavity of the hub 5.

The transient-operation valve being a valve which allows a high-pressure compressor of the turbine engine to discharge during starting and acceleration, the air flow 7 is a hot air flow which allows the hub 5 to be heated, and thus to limit the temperature difference between the hub 5 and the shroud 4 during takeoff and acceleration phases of the aircraft.

Thus, the appearance of tension forces at the arms 6 which occur during takeoff or acceleration phases of the aircraft is limited, and the lifetime of the exhaust casing 2 is therefore increased.

Advantageously, despite the fact that the oil circulation circuits present in the oil utility arms 62 are heated by the air flow 7, there is no increase in the risk of coking of the oil. In fact, the high-pressure compressor discharging through the transient-operation valve only during starting or acceleration phases of the aircraft, the oil is not heated during the periods during which it no longer circulates, and thus the risk of coking is not increased.

Thus, this can be easily implemented on turbine engines without requiring costly adaptation work, and does not bring with it an oil coking problem. In fact, generally on known turbine engines, the mouths 3 to which are connected the outlet tubes 30 are disposed on the shroud 4 of the exhaust casing 2, so as to eject the air flow 7 between the arms 6 connecting the shroud to the hub 5. Thus, only a slight adaptation of the exhaust casing 2 is necessary.

In the first embodiment of the invention, so as to improve the homogeneity of the heating of the hub 5, and as illustrated in FIG. 2, a portion of the air flow 7 which leaves the hollow arms 63 is oriented toward a zone of the hub 5 to which the yoke arms 61 are attached. In fact, this zone of said hub 5 is not directly heated by a hot air flow 7 exiting the arm 6 to which it is attached.

The arms 6 each comprise a stiffener 60 which is situated inside the hub 5. As illustrated in FIG. 2, the air flow 7 leaves the hollow arms 63 at the stiffeners 60.

In the embodiment, the air flow 7 which leaves a hollow arm 63 which adjoins a yoke arm 61 is deflected toward the stiffener 60 of said yoke arm 61 by a deflector 8. The deflector 8 can be implemented by a curved sheet-metal part which is disposed at the stiffener 60 of said hollow arm 63 adjoining said yoke arm 61.

In the first embodiment illustrated in FIG. 2, the three yoke arms 61 are disposed consecutively, so that only two hollow arms 63 adjoin a yoke arm 61.

Figure 3:
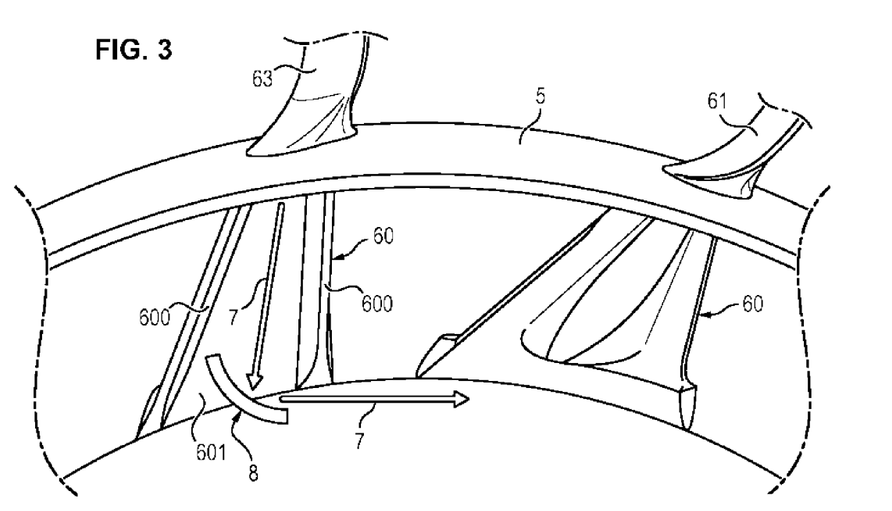
FIG. 3 shows a detailed view of the reinforcements of the arms connecting the shroud to the hub according to a variant of the first embodiment, in which the stiffener of the arm comprises only one front orifice.

According to a first variant of the first embodiment, which is illustrated in FIG. 3, the reinforcement 60 of the hollow arm 63 which adjoins the yoke arm 61 comprises two lateral walls 600 which form a channel which comprises a front orifice 601 through which the air flow 7 flows when exiting the hollow arm 63. The front orifice 601 is situated in the extension of the cavity of the hollow arm 63.

In the first variant of the first embodiment, the deflector 8 is disposed at the front orifice 601 so as to deflect the air flow 7 toward the reinforcement 60 of the yoke arm 61.

Figure 4:
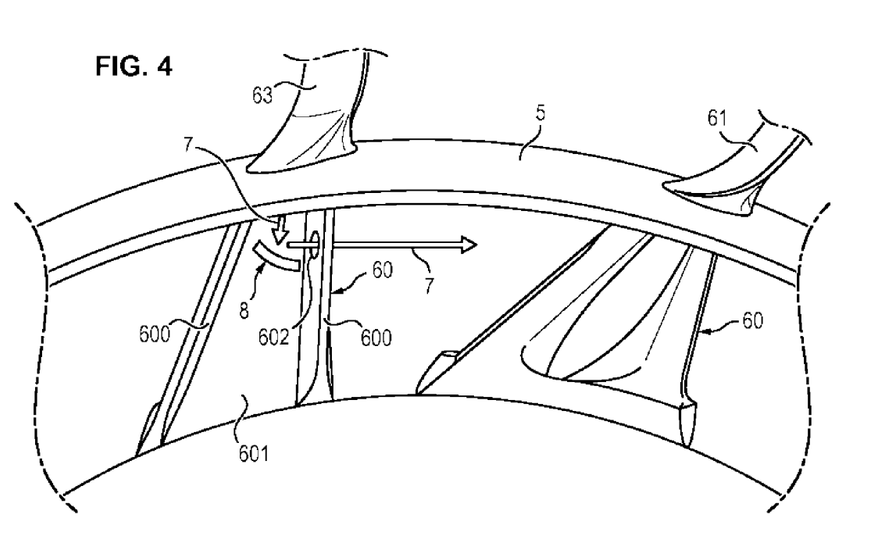
FIG. 4 shows a detailed view of the reinforcements of the arms connecting the shroud to the hub according to another variant of the first embodiment, in which the stiffener of the arm comprises a side orifice.
Figure 5:
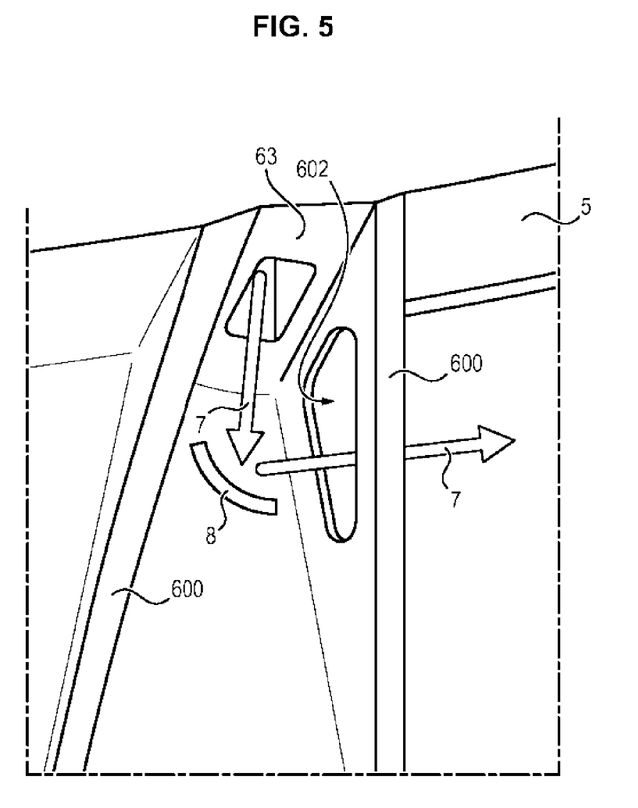
FIG. 5 shows an even more detailed view that FIG. 4 of the variant of the first embodiment in which the stiffener comprises a side orifice.

According to a second variant of the first embodiment, which is illustrated in FIGS. 4 and 5, the lateral walls 600 each comprise a side orifice 602 (only one side orifice 602 is shown in FIGS. 4 and 5). Thus, the deflector 8 is situated inside the reinforcement 60 at the side orifice 602, and deflects the air flow 7 toward the yoke arm 61 through the side orifice 602.

Preferably, in the first embodiment, the air flow 7 exiting the hollow arms 63 is not directly deflected toward the oil utility arms 62, so as not to bring about overheating of the oil.

Figure 6:
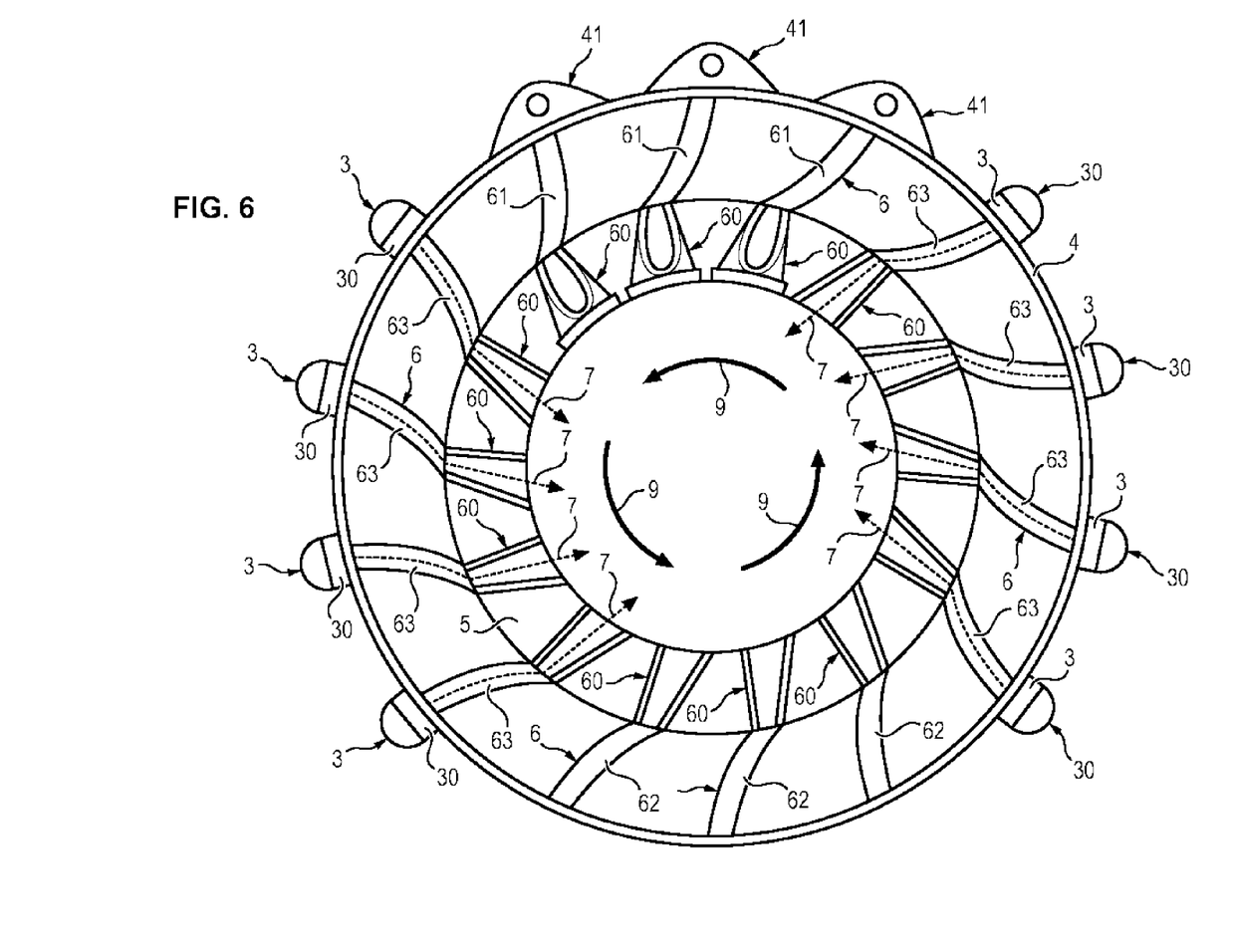
FIG. 6 shows a view of a section of an exhaust casing according to a second embodiment.

According to a second embodiment illustrated in FIG. 6, the air flow 7 is not directly deflected toward the reinforcements 60 of the yoke arms 63 by deflectors 8. In fact, when the exhaust casing 2 is a tangential arm casing, the homogenization of the heating of the hub 5 is ensured by a vortex 9 of hot air (or swirl) in the cavity of the hub 5. An exhaust casing with tangential arms is understood here to be a casing the arms of which are inclined with respect to the normal with respect to the outer surface of the hub.

Thus, the arms 6 being inclined with respect to the normal with respect to the outer surface of the hub 5, the air flow 7 arrives in the interior of the hub 5 with an inclination with respect to the normal, which forms the vortex 9 under the influence of centrifugal force.

The invention claimed is:

1. An exhaust casing for an aircraft turbine engine comprising a shroud, a hub forming a cavity, at least one hollow arms connecting said shroud to said hub, and at least one mouth situated on the shroud and which is suitable to be connected to an outlet tube of a transient-operation valve of the turbine engine, said at least one mouth is attached to the shroud in the extension of the at least one hollow arm, so that an air flow exiting the outlet tube of the transient-operation valve penetrates into the at least one hollow arm and circulates in the cavity of the hub, wherein the exhaust casing comprises at least one yoke arm connecting said shroud to said hub, wherein the at least one yoke arm is solid and comprises a first stiffener, the first stiffener being situated in the hub, and that the at least one hollow arm adjoins said at least one yoke arm and comprises a deflector so as to deflect the air flow exiting said at least one hollow arm toward the first stiffener of the at least one yoke arm.

2. The exhaust casing according to claim 1, wherein the at least one hollow arm adjoining the at least one yoke arm comprises a second stiffener which comprises a side orifice, and that the deflector is situated inside said second stiffener of said at least one hollow arm so as to deflect at least a portion of the air flow exiting said at least one hollow arm toward the first stiffener of the at least one yoke arm through said side orifice.

3. The exhaust casing according to claim 1, wherein the at least one hollow arm which adjoins the at least one yoke arm comprises a second stiffener which comprises a front orifice and that the deflector is situated at said front orifice.

4. The exhaust casing according to claim 1, wherein the deflector is a curved sheet-metal part.

5. The exhaust casing according to claim 1, wherein the at least one hollow arm and the at least one yoke arm are tangential arms.

6. A turbine engine comprising the exhaust casing according to claim 1, wherein said turbine engine comprises the transient bleed valve comprising the outlet tube which is connected to the at least one mouth of said exhaust casing.

7. An aircraft comprising the turbine engine according to claim 6.

8. The exhaust casing according to claim 2, wherein the deflector is a curved sheet-metal part.

9. The exhaust casing according to claim 3, wherein the deflector is a curved sheet-metal part.

10. The exhaust casing according to claim 2, wherein the at least one hollow arm and the at least one yoke arm are tangential arms.

11. The exhaust casing according to claim 3, wherein the at least one hollow arm and the at least one yoke arm are tangential arms.

12. A turbine engine comprising the exhaust casing according to claim 2, wherein said turbine engine comprises the transient bleed valve comprising the outlet tube which is connected to the at least one mouth of said exhaust casing.

13. A turbine engine comprising the exhaust casing according to claim 3, wherein said turbine engine comprises the transient bleed valve comprising the outlet tube which is connected to the at least one mouth of said exhaust casing.

14. An aircraft comprising the turbine engine according to claim 12.

15. An aircraft comprising the turbine engine according to claim 13.

* * * * *